(12) United States Patent
Mertdogan

(10) Patent No.: US 6,416,698 B1
(45) Date of Patent: Jul. 9, 2002

(54) FLUOROPOLYMER FINISHING PROCESS

(75) Inventor: Cynthia Asli Mertdogan, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/484,153

(22) Filed: Jan. 18, 2000

Related U.S. Application Data

(60) Provisional application No. 60/120,512, filed on Feb. 18, 1999.

(51) Int. Cl.$^7$ .................................................. C08J 3/16
(52) U.S. Cl. ........................ 264/117; 264/235; 264/346; 526/247; 528/502 F; 528/503
(58) Field of Search ................................ 264/109, 117, 264/235, 346; 526/247, 252, 253, 243; 528/502 R, 502 F, 503

(56) References Cited

U.S. PATENT DOCUMENTS

| 4,743,658 A | 5/1988 | Imbalzano et al. ...... 525/326.4 |
| 4,808,651 A | 2/1989 | Blickle et al. ............... 524/366 |
| 5,268,411 A | 12/1993 | Yokotsuka et al. ......... 524/462 |
| 6,258,907 B1 * | 7/2001 | Funaki et al. ............... 526/247 |

FOREIGN PATENT DOCUMENTS

| CA | 1248292 | 1/1989 | ................. 402/534 |
| EP | 0 222 945 | 5/1987 | |
| EP | 0 261 501 | 3/1988 | |
| EP | 0 224 037 | 6/1989 | |
| JP | 7-278314 | 10/1995 | |

OTHER PUBLICATIONS

R. E. Banks, Preparation, Properties, and Industrial Applications of Organofluorine Compounds, Ellis Horwood Limited, p. 100, 1982.

* cited by examiner

*Primary Examiner*—Mathieu D. Vargot

(57) ABSTRACT

Beads of melt-fabricable fluoropolymer dispersion particles are produced by a solvent-aided pelletization process using fluorinated solvent containing ether oxygen.

18 Claims, No Drawings

FLUOROPOLYMER FINISHING PROCESS

This application claims benefit of Prov. No. 60/120,512 filed Feb. 18, 1999.

FIELD OF THE INVENTION

This invention is in the field of finishing processes for melt-fabricable fluoropolymer resins, particularly for making beads from aqueous dispersions of such fluoropolymers.

BACKGROUND OF THE INVENTION

Melt-fabricable fluoropolymers are well known. Such polymers include vinylidene fluoride ($VF_2$) homopolymers and copolymers, copolymers of ethylene with tetrafluoroethylene (TFE) or chlorotrifluoroethylene (CTFE), and copolymers of TFE with hexafluoropropylene (HFP) and/or perfluoro(alkyl vinyl ether) (PAVE). They are considered to be melt-fabricable because they can be fabricated into useful articles by conventional methods such as melt extrusion and injection molding. Since a large fraction of melt-fabricable fluoropolymers is processed by such techniques, such fluoropolymers are most commonly sold as cubes suitable for feeding to extruders and injection molding machines. Cubes, typically having dimensions of the order of 3 mm, are usually prepared by melt extruding raw polymer into coarse strands and then cutting the strands.

Such cubes are not suitable for all uses, and other physical forms of melt-fabricable fluoropolymer such as powders and aqueous dispersions are also supplied. One use for which extrusion cubes are not suitable is rotational casting (rotocasting), which encompasses rotational molding (rotomolding) and rotational lining (rotolining). Rotocasting requires a combination of good solid-state flow of the fluoropolymer particles to facilitate uniform distribution of resin in the final article, and a spherical shape and small particle size, in the range of 0.1–0.5 mm, to promote a smooth profile on the free surface of the article. The free surface is that surface not in contact with the surface of the mold or with the surface of the article to be lined. A convenient product form for this purpose is a bead or granule such as that disclosed by Buckmaster et al. in Canadian Patent 1,248,292. Such beads can be prepared, as therein disclosed, by agitation of aqueous dispersion of fluoropolymer particles in the presence of electrolyte and water-immiscible organic liquid, a process known as solvent-aided coagulation or as solvent-aided pelletization (SAP). Optionally, after isolation from the liquid, the resultant beads can be subjected to treatments to harden them and/or to stabilize any unstable end groups present on the fluoropolymer.

Water-immiscible organic liquids that can be used in SAP processes include the aliphatic hydrocarbons such as hexane, heptane, gasoline and kerosene, aromatic hydrocarbons such as benzene, toluene and xylene, halogenated derivatives such as carbon tetrachloride, monochlorobenzene, the trichlorotrifluoroethanes, difluorotetrachloroethanes, and liquid oligomers of chlorotrifluoroethylene as disclosed in Canadian Patent 1248292, in which 1,1,2-trichloro-1,2,2-trifluoroethane (CFC-113) is used in the examples. Hydrocarbons are hazardous because of their flammability, while chlorocarbons and CFCs present environmental problems. Alternative water-immiscible liquids for use in SAP processes include the hydrofluorocarbons (HFC) disclosed by Takakura and Funagi in Japanese Patent Application Publication (Kokai) H07-2783 14. While such HFCs have low ozone depletion potential (ODP), they do have global warming potential (GWP). For example, one isomer of $C_5H_2F_{10}$(HFC 43-10) has GWP of about 1300. Furthermore, HFCs can be sensitive to alkaline gelation agents, which restricts their application to acidic gelation processes. Additional environmentally friendly solvents are needed for SAP.

The SAP process is complicated in the sense that many variables are involved. Any change, e.g., a new solvent, may require adjustment of other variables. A process for preparing beads that has a broader operating window, i.e., is less sensitive to the variables, is desired.

SUMMARY OF THE INVENTION

This invention provides a process comprising forming beads of melt-fabricable fluoropolymer resin by solvent-aided pelletization of aqueous dispersion of particles of said resin, wherein said solvent-aided pelletization is carried out using fluorinated solvent containing oxygen in which the oxygen is present only as ether oxygen. Fluorinated solvents containing ether oxygen include (a) perfluorinated cyclic amines of formula (I) hereafter, (b) hydrofluoroethers having the formula R—O—$R_f$, wherein R is alkyl having 1–3 carbon atoms and $R_f$ is linear or branched fluoroalkyl having 2–7 carbon atoms and containing no halogen other than fluorine and at most one terminal hydrogen atom, and (c) hydrofluoroether having the formula $R_4$—O—$R_5$, wherein $R_4$ is a fluoroalkyl having 1–6 carbon atoms and at least one hydrogen atom and $R_5$ is linear or branched fluoroalkyl containing no halogen other than fluorine and having 1–7 carbon atoms and optionally containing ether oxygen. Preferred solvents include hydrofluoroethers.

The process of the invention has environmental advantages, and also yields small well-formed beads over a broad range of solvent-to-polymer ratio, extending to low solvent-to-polymer ratios.

DETAILED DESCRIPTION

It has been discovered that organic liquids having oxygen present only as ether oxygen can be used in SAP processes for agglomeration of melt-fabricable fluoropolymer particles in aqueous dispersion. Preferably, the organic liquids have one ether oxygen per molecule.

Organic liquids that can be used to form beads of melt-fabricable fluoropolymer resin by the SAP process of the present invention include perfluorinated cyclic amines having a nitrogen atom in the ring and having an ether oxygen in the ring. These compounds have no ODP.

Among the perfluorinated cyclic amines useful in this invention are those having the general formula

(I)

in which $R_1$ is a linear or branched saturated perfluorocarbon group having 1–4 carbon atoms, $R_2$ and $R_3$ are linear or branched saturated perfluorocarbon groups having, independently, 1–5 carbon atoms, and the total number of carbon atoms in the molecule of formula (I) is 3–10.

Examples of compounds of formula (I) include perfluoro-N-methylmorpholine (PFNMM) and perfluoro-N-isopropylmorpholine. Preferred compounds of formula (I) are those in which the total number of carbon atoms is 4–8 and the number of atoms bonded in the ring is 5–6. Especially preferred compounds are those in which $R_2$ and $R_3$ are —$CF_2CF_2$—, and $R_1$ has 1–3 carbon atoms. PFNMM and perfluoro-N-isopropylmorpholine are available commercially (Fluorinert® PF-5052 and FC-6003, respectively, 3M Company). PFNMM is most preferred.

Organic liquids that can be used also include hydrofluoroethers (HFE) having the formula R—O—$R_f$, wherein R is alkyl having 1–3 carbon atoms, preferably 1–2 carbon atoms, and $R_f$ is linear or branched fluoroalkyl, preferably linear, containing no halogen other than fluorine and having 2–7 carbon atoms, preferably 4–5 carbon atoms, and at most one terminal hydrogen atom. Preferably, $R_f$ is perfluorinated. Examples of HFE that can be used include perfluorobutyl methyl ether ($CH_3$—O—$C_4F_9$) and perfluorobutyl ethyl ether ($C_2H_5$—O—$C_4F_9$). These are commercially available as HFE-7100 and HFE-7200 respectively, from 3M Company, St. Paul Minn. USA. Other suitable HFE have the formula $R_4$—O—$R_5$, wherein $R_4$ is a fluoroalkyl having 1–6 carbon atoms, preferably 1–3 carbon atoms, and at least one hydrogen atom, preferably on the carbon adjacent to the oxygen atom, and $R_5$ is linear or branched fluoroalkyl, preferably linear, containing no halogen other than fluorine and having 1–7 carbon atoms, preferably 2–4 carbon atoms and optionally containing ether oxygen. Preferably $R_5$ is perfluorinated. Examples include $CF_3$—CHF—O—$CF_2$—$CF_2$—$CF_3$ and $CF_3$—CHF—O—$CF_2$—CF(CF3)—O—$CF_2$—$CF_2$—$CF_3$, the preparation of which is described in Preparation, properties, and industrial applications of organofluorine compounds, by R. E. Banks, John Wiley and Sons, NY, 1982, page 100.

Among organic liquids having oxygen present only as ether oxygen, the HFE described above are preferred.

The process of this invention may employ any of the techniques known to use a water-immiscible organic liquid (solvent) to pelletize particles of fluoropolymer initially present in an aqueous medium. Typically, a vessel equipped with baffles is charged with a quantity of aqueous dispersion of fluoropolymer particles. The aqueous dispersion is agitated with an impeller rotating at a chosen speed, and, with agitation continuing, an electrolyte (sometimes called a gelation agent) is added. A quantity of solvent is added, either simultaneously with electrolyte addition or sequentially, and agitation is continued for several minutes, optionally at different speed. The resultant product is filtered to drain away the liquid, and the beads are dried, usually at elevated temperature and optionally under vacuum. One skilled in the art will recognize that many variations of this process are possible within the scope of the present invention. For example, the temperature of the mixture can be increased toward the end of the process to boil off the solvent before screening the beads from the liquid. This alternative can facilitate solvent recovery.

Optionally, the resultant beads can be subjected to various treatments. For example, the beads can be heat hardened by baking them for several hours, e.g., 3–24 hr, either under nitrogen or in air, at a temperature near but below the melting point of the fluoropolymer as determined by differential scanning calorimetry (DSC), e.g., within 30° C. of the melting point. Drying and heat hardening can be combined if drying is carried out at high temperature. Additionally or alternatively, for example, the beads can be treated with elemental fluorine to reduce the concentration of unstable end groups as disclosed by Canadian Patent 1248292 or by Imbalzano and Kerbow in U.S. Pat. No. 4,743,658.

Preferably, the fluoropolymer particles are produced by dispersion polymerization as known in the art. The dispersion thus produced is referred to as "raw dispersion". For solvent assisted pelletization, the raw dispersion may be used directly or after addition of water to adjust the solids concentration. Average fluoropolymer raw dispersion particle size (RDPS) is generally in the range of 50–350 nm, preferably in the range of 100–300 nm, more preferably in the range of 150–250 nm. The concentration of polymer solids in water is usually in the range of about 10–30 wt %, preferably 14–25 wt %, based on combined weight of polymer particles and water. While temperature is a variable in pelletization, the temperature at which the agglomeration bead-forming process is carried out can be any convenient temperature between the freezing point of water and the boiling point of the solvent used. Room temperature is convenient and preferred for this reason, but higher temperature favors formation of smaller beads. The amount of electrolyte used will vary with the strength of the electrolyte, and is sufficient to cause formation of a gel, hence the term "gelation agent". Generally, the amount of electrolyte is in the range of about 0.4–10 wt %, preferably 0.5–5 wt %, based on the dry weight of polymer solids. The amount of solvent used is generally such that the solvent-to-polymer (S/P) ratio on a weight basis is in the range of about 0.4–1.4, preferably 0.5–1.0. The duration of agitation before electrolyte addition, the duration of agitation after gelation, and the duration of agitation after addition of the solvent can be selected independently. For efficiency reasons, it is desirable that the process be as short as possible. The three recited times are usually of the order of minutes. However, the agitation profile is usually chosen to ensure that the structure of the gel is maintained, that is, that the gel is not broken into separate phases before the solvent is added. Thus, the agitation time is relatively short and the agitation speed is relatively low in the intervals before solvent addition. The absolute agitation speed used, of course, will vary with the scale of the equipment. Typically, the duration of agitation after solvent addition is relatively long to enhance the uniformity of the resultant beads. Agitation speed after solvent addition influences the size of the beads, and may be faster than in earlier intervals, faster agitation generally resulting in smaller beads. Typically, the preliminary agitation period is in the range of about 0–5 min, the agitation period after electrolyte addition is in the range of about 0–20 min, and the agitation period after solvent addition is in the range of about 1–10 min.

Melt-fabricable fluoropolymers that can be used in the process of the present invention are made from at least one fluorine-containing monomer, but may incorporate monomer(s) which contain no fluorine or other halogen, and preferably contain at least 35 wt % fluorine. Examples of melt-fabricable fluoropolymers include copolymers of TFE with one or more copolymerizable comonomers chosen from perfluoroolefins having 3–8 carbon atoms and perfluoro(alkyl vinyl ethers) (PAVE) in which the linear or branched alkyl group contains 1–5 carbon atoms, with comonomer(s) in the copolymer present in amount(s) sufficient to reduce the melting point of the copolymer substantially below that of TFE homopolymer, e.g., to a melting point no greater than 315° C. Preferred perfluoropolymers include copolymers of TFE with at least one of hexafluoropropylene (HFP) and PAVE. TFE/PAVE copolymers are especially preferred. Preferred comonomers include PAVE in which the alkyl group contains 1–3 carbon atoms, especially 2–3 carbon atoms, i.e., perfluoro(ethyl vinyl ether) (PEVE) and perfluoro(propyl vinyl ether) (PPVE). Additional fluoropolymers that can be used include copolymers of ethylene with TFE (ETFE), optionally including minor amounts of one or more modifying comonomer such as perfluorobutyl ethylene (PFBE). Other hydrogen-containing fluoropolymers that can be used include copolymers of ethylene and chlorotrifluoroethylene (ECTFE), and vinylidene fluoride homopolymers and copolymers. Generally, melt-fabricable resins have melt viscosity (MV) in the range of $0.5$–$50 \times 10^3$ Pa·s though viscosities outside this range can be used. MV is measured according to ASTM D-1238 at the temperature appropriate for the particular fluoropolymer. Preferably, MV is in the range of $1$–$35 \times 10^3$ Pa·s. Such fluoropolymers can be produced by aqueous dispersion polymerization as known in the art.

Beads produced by the process of the present invention can have a wide range of dimensions, such as $D_{50}$ of 100–3000 μm measured as described below. $D_{50}$ of 200–1000 μm is preferred.

EXAMPLES

The laboratory-scale apparatus for the following examples is a 2-L glass beaker equipped with a cylindrical stainless steel insert, whose outer diameter is only slightly smaller than the inner diameter of the beaker, and an agitator. The beaker is 7 inch (17.8 cm) high and 5.125 inch (13 cm) in diameter. Four vertical baffles equally-spaced around the stainless steel insert are 5.6 inch (14.2 cm) tall, starting at the bottom of the cylinder, are 0.47 inch (1.2 cm) wide, and extend 0.6 inch (1.5 cm) radially from the cylinder into the beaker. The variable-speed agitator is on a vertical shaft having 4 rectangular blades at the bottom end of the shaft, which is mounted about 0.5 inch (1.3 cm) above the bottom of the beaker. The blades are 1.4 cm wide, approximately 3 mm thick, and approximately 1.5 inch (3 cm) long so that the circle defined by the tips of the rotating blades is 7.5 cm in diameter. The plane of each blade is inclined at an angle of approximately 35° from horizontal so as to pump upward when the agitator is rotated.

One skilled in the art will recognize that the absolute properties of agglomerates made in laboratory-scale apparatus such as described above, with laboratory procedures such as described below, may be and in general will be different from those obtained when a proportionate procedure is carried out in commercial equipment. However, the relative results of changing one or more of the variables are expected to carry over to other equipment when scaled appropriately. In these examples, the amount, solids content, and temperature of the fluoropolymer dispersion, the agitation after gelation, and the agitation after addition of the solvent are fixed. The parameters that are varied are the preliminary agitation time and speed, the type and amount of gelation agent, the solvent type, and the amount of solvent and thus the solvent-to-polymer ratio (S/P).

Unless otherwise stated, the general procedure is as follows. The beaker is charged with 590 g of fluoropolymer dispersion at room temperature and 20 wt % solids, achieved by diluting the raw (as-polymerized) dispersion with demineralized water. The dispersion is agitated at 1000 rpm and after 1 min, with agitation continuing, the gelation agent is added quickly, the time for gelation is noted, and the gel is agitated for an additional minute. Next, the solvent is added quickly and the agitation speed is simultaneously increased to 2250 rpm. Agitation at this speed is continued for 5 min and then stopped. The resultant product is poured into cheese cloth to drain away the liquid and the solids are dried for 3 hr in a vacuum oven at 150° C. and then baked under nitrogen for 8 hr at 280° C.

Average particle size ($D_{50}$) of beads is measured by dry sieve analysis generally following the procedure of ASTM D-4895-94 (10.3) using 3-inch (76-mm) diameter U.S. Standard Sieves conforming to Specification E 11. Seven to eight adjacent sieves are selected with openings between 7 and 100 mesh. A 10 g representative portion of the sample to be tested, weighed to the nearest 0.01 g, is charged to the top screen. The screen set is shaken either mechanically or manually for 1–10 min. After shaking, the net weight of material retained on each sieve is determined to the nearest 0.01 g. The weight average particle size is determined from a plot of the cumulative percentage retained vs. sieve opening dimension on log-probability paper as described in ASTM method D-1921-89, or by equivalent computer interpolation of these data. The average particle size in micrometers (μm) is read from the plot at the $50^{th}$ percentile ($D_{50}$) abscissa of cumulative weight percentage retained.

The quality of the beads is observed by inspection with the naked eye.

Solvents are described in Table 1. The stated codes are used for identification in the examples.

TABLE 1

Solvents for Pelletization

| Code | Name | ODP | GWP | Source |
|---|---|---|---|---|
| CFC-113 | 1,1,2-trichloro-1,2,2-trifluoroethane | 0.8 | 5000 | DuPont |
| PFNMM | Perfluoro-N-methylmorpholine | 0 | 5000 | 3M |
| HFE-7100 | Perfluorobutyl methyl ether | 0 | 500 | 3M |
| HFE-7200 | Perfluorobutyl ethyl ether | 0 | 90 | 3M |

Examples 1–2 and Control A

The general procedure outlined above for forming beads is followed using dispersions of TFE/PPVE copolymer (PFA) prepared generally according to the procedure of Gresham and Vogelpohl in U.S. Pat. No. 3,635,936. For S/P of 0.8–1.2, the dispersion has RDPS of 223 nm and the fluoropolymer resin contains 3.4 wt % of PPVE and has MV of $8.57 \times 10^3$ Pa·s. For S/P of 0.6–0.7, the dispersion has RDPS of 207 nm and the fluoropolymer resin contains 3.7 wt % of PPVE and has MV of $8.44 \times 10^3$ Pa·s. The gelation agent is diethylamine and the amount is 3 mL (1.8 wt % based on polymer solids). Solvents and the amounts used, expressed as S/P ratio, are shown in Table 2. Values for $D_{50}$ in Table 2 show that HFE-7100, particularly, and PFNMM are effective solvents for pelletization under these conditions. Furthermore, they yield smaller well-formed beads than does CFC-113, and over a broader S/P range extending to lower S/P ratios. Use of less solvent (lower S/P) is environmentally desirable. The term "clumps" characterizes clusters or agglomerations of dispersion particles having the general appearance of popcorn. Clumps, powder, and irregular, that is, non-spherical beads, are undesirable in rotocasting applications.

TABLE 2

S/P Ratios and Bead Diameters for Examples 1–2 and Control A

| Ex. | Solvent | S/P | $D_{50}$ (μm) | Observations |
|---|---|---|---|---|
| 1 | HFE-7100 | 0.6 | 160 | Spherical beads, some powder |
| | | 0.7 | 368 | Spherical beads |
| | | 0.8 | 920 | Spherical beads |
| | | 1.0 | 1986 | Clumps |
| | | 1.2 | — | Clumps, too large for sieves |

TABLE 2-continued

S/P Ratios and Bead Diameters for Examples 1–2 and Control A

| Ex. | Solvent | S/P | $D_{50}$ (μm) | Observations |
|---|---|---|---|---|
| 2 | PFNMM | 0.6 | — | Powder |
|  |  | 0.8 | 620 | Spherical beads |
|  |  | 1.0 | 1040 | Spherical beads |
|  |  | 1.2 | — | Clumps, too large for sieves |
| A | CFC-113 | 0.7 | 1325 | Irregular beads |
|  |  | 0.8 | 1640 | Irregular beads |
|  |  | 1.0 | 1230 | Clumps |
|  |  | 1.2 | 2400 | Clumps |

Examples 3–6 and Controls B and C

The general procedure outlined above for forming beads is followed using the dispersion of Examples 1–2 having RDPS of 207 nm. The gelation agent is 70% nitric acid and the amount is 1 mL (0.84 wt % of $HNO_3$ based on polymer solids). Solvents and the amounts used, expressed as S/P ratio, are shown in Table 3. Values for $D_{50}$ in Table 3 show that HFE-7100 and PFNMM are effective solvents for pelletization under these conditions. Furthermore, they yield smaller beads than does CFC-113.

TABLE 3

S/P Ratios and Bead Diameters for Examples 3–6 and Controls B and C

| Ex. | Solvent | S/P | $D_{50}$ (μm) | Observations |
|---|---|---|---|---|
| 3 | HFE-7100 | 0.7 | 610 | Spherical beads |
| 4 | PFNMM | 0.7 | 445 | Spherical beads |
| B | CFC-113 | 0.7 | 625 | Spherical beads |
| 5 | HFE-7100 | 0.8 | 410 | Spherical beads |
| 6 | PFNMM | 0.8 | 535 | Spherical beads |
| C | CFC-113 | 0.8 | 920 | Spherical beads |

Examples 7–9 and Control D

The general procedure outlined above for forming beads is followed using the dispersion of Examples 1–2 having RDPS of 207 nm. Instead of pelletizing at room temperature, the temperature of the polymer solutions was elevated to 35° C. for these examples. The gelation agent is diethylamine and the amount is 3 mL (1.8 wt % based on polymer solids). Solvents and the amounts used, expressed as S/P ratio, are shown in Table 4. Values for $D_{50}$ in Table 4 show that HFE-7100 and PFNMM are effective solvents for pelletization under these conditions. Furthermore, they yield smaller beads under these conditions than does CFC-113.

TABLE 4

S/P Ratios and Bead Diameters for Examples 7–9 and Control D

| Ex. | Solvent | S/P | $D_{50}$ (μm) | Observations |
|---|---|---|---|---|
| 7 | HFE-7100 | 1.0 | 880 | Spherical beads |
| 8 | PFNMM | 1.0 | 630 | Spherical beads |
| 9 | PFNMM | 1.1 | 860 | Spherical beads |
| D | CFC-113 | 1.0 | 1295 | Clumps |

Examples 10–12 and Control E and F

The general procedure outlined above for forming beads is followed using dispersions of TFE/PEVE copolymer (PFA) prepared generally according to the procedure of Aten, Jones, and Olson in U.S. Pat. No. 5,760,151. The dispersion has RDPS of 192 nm and the fluoropolymer resin contains 7.1 wt % of PEVE and has MV of $21.3 \times 10^3$ Pa·s. The gelation agent is diethylamine and the amount is 3 mL (1.8 wt % based on polymer solids). Solvents and the amounts used, expressed as S/P ratio, are shown in Table 5. Values for $D_{50}$ in Table 5 show that HFE-7100 and PFNMM are effective solvents for pelletization under these conditions. Furthermore, they yield smaller well-formed beads under these conditions than does CFC-113, and over a broader S/P range extending to lower S/P ratios. Use of less solvent (lower S/P) is environmentally desirable.

TABLE 5

S/P Ratios and Bead Diameters for Examples 10–12 and Controls E and F

| Ex. | Solvent | S/P | $D_{50}$ (μm) | Observations |
|---|---|---|---|---|
| 10 | HFE-7100 | 0.6 | 1300 | Spherical beads |
| 11 | PFNMM | 0.6 | 720 | Spherical beads |
| 12 | PFNMM | 0.8 | 1500 | Spherical beads |
| E | CFC-113 | 0.6 | 1550 | Spherical beads |
| F | CFC-113 | 0.8 | 2395 | Clumps |

Examples 13–16 and Controls G and H

The general procedure outlined above for forming beads is followed using dispersions prepared as described in Examples 10–12. For S/P of 0.65, the dispersion has RDPS of 188 nm and the fluoropolymer resin contains 6.7 wt % of PEVE and has MV of $18.3 \times 10^3$ Pa·s. For S/P of 0.7, the dispersion has RDPS of 192 nm and the fluoropolymer resin contains 7.1 wt % of PEVE and has MV of $21.3 \times 10^3$ Pa·s. The gelation agent is 70% nitric acid and the amount is 1 mL (0.84 wt % of HNO3 based on polymer solids). Solvents and the amounts used, expressed as S/P ratio, are shown in Table 6. Values for $D_{50}$ in Table 6 show that HFE-7100 and PFNMM are effective solvents for pelletization under these conditions. Furthermore, they yield smaller beads under these conditions than does CFC-113.

TABLE 6

S/P Ratios and Bead Diameters for Examples 13–16 and Controls G and H

| Ex. | Solvent | S/P | $D_{50}$ (μm) | Observations |
|---|---|---|---|---|
| 13 | HFE-7100 | 0.65 | 1620 | Spherical beads |
| 14 | PFNMM | 0.65 | 740 | Spherical beads |
| G | CFC-113 | 0.65 | 2800 | Clumps |
| 15 | HFE-7100 | 0.7 | 950 | Spherical beads |
| 16 | PFNMM | 0.7 | 970 | Spherical beads |
| H | CFC-113 | 0.7 | 1500 | Spherical beads |

These examples show that the solvents of this invention are effective in the pelletization of aqueous dispersions of fluoropolymers with either acidic or alkaline gelation agents. At the same solvent/polymer ratio, the solvents generally give beads of smaller diameter than the control solvent. At the same solvent/polymer ratio, the solvents generally give beads of smaller diameter and of more spherical aspect than the control solvent. The solvents of this invention thus have the advantage of producing polymer beads with a combination of characteristics for good solid-state flow to produce uniformity of coating and subsequent smooth surfaces.

Example 17 and Control I

The general procedure outlined above for forming beads is followed using dispersions of TFE/HFP copolymer (FEP)

prepared generally according to the procedure of Carlson in U.S. Pat. No. 4,029,868. The dispersion has RDPS of 262 nm and the fluoropolymer resin contains 6.5 wt % of HFP and 1.5 wt % PEVE, based on the calculation of 3.2×HFPI, and has MV of 14.4×10$^3$ Pa·s. The gelation agent is 70% nitric acid and the amount is 1 mL (0.84 wt % of HNO$_3$ based on polymer solids). Solvents and the amounts used, expressed as S/P ratio, are shown in Table 7. Values for D$_{50}$ in Table 7 show that HFE-7100 is an effective solvent for pelletization under these conditions. Furthermore, it forms beads under a wider range of conditions than does CFC-113.

TABLE 7

S/P Ratios and Bead Diameters for Example 17 and Control I

| Ex. | Solvent | S/P | D$_{50}$ ($\mu$m) | Observations |
|---|---|---|---|---|
| 17 | HFE-7100 | 0.6 | 730 | Spherical beads |
|  |  | 0.65 | 1850 | Spherical beads |
|  |  | 0.7 | 1450 | Spherical beads |
| I | CFC-113 | 0.6 |  | Powder |
|  |  | 0.65 | 745 | Spherical beads |
|  |  | 0.7 | 1500 | Spherical beads |

The examples demonstrate that the use of ether oxygen-containing fluorinated solvents in solvent-aided pelletization processes is advantageous, as compared to conventional solvents used in such processes, in that for similar concentrations of the ether oxygen-containing fluorinated solvents and conventional solvents, the ether oxygen-containing fluorinated solvents result in smaller particle sizes for the fluoropolymer resin pellets formed. Additionally, the use of ether oxygen-containing fluorinated solvents according to the present invention is more environmentally friendly than for many conventional solvents for solvent-aided pelletization, and in many cases lower concentrations of ether oxygen-containing fluorinated solvents may be used to effect pelletization resulting in lower overall solvent consumption.

What is claimed is:

1. A process comprising forming beads of melt-fabricable fluoropolymer resin by solvent-aided pelletization of aqueous dispersion of particles of said resin, wherein said solvent-aided pelletization is carried out using fluorinated solvent containing oxygen only as ether oxygen.

2. The process of claim 1, wherein said solvent is selected from the group consisting of (a) perfluorinated cyclic amine having the general formula

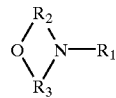

(I)

wherein R$_1$ is a linear or branched saturated perfluorocarbon group having 1–4 carbon atoms, R$_2$ and R$_3$ are linear or branched saturated perfluorocarbon groups having, independently, 1–5 carbon atoms, and the total number of carbon atoms in the molecule of formula (I) is 3–10, (b) hydrofluoroether having the formula R—O—R$_f$, wherein R is alkyl having 1–3 carbon atoms, and R$_f$ is linear or branched fluoroalkyl containing no halogen other than fluorine and having 2–7 carbon atoms, and at most one terminal hydrogen atom, and (c) hydrofluoroether having the formula R$_4$—O—R$_5$, wherein R$_4$ is a fluoroalkyl having 1–6 carbon atoms and at least one hydrogen atom and R$_5$ is linear or branched fluoroalkyl containing no halogen other than fluorine, having 1–7 carbon atoms.

3. The process of claim 2, wherein said solvent is a hydrofluoroether.

4. The process of claim 3, wherein said hydrofluoroether is CH$_3$—O—C$_4$F$_9$.

5. The process of claim 3, wherein R$_f$ is perfluoroalkyl.

6. The process of claim 1, wherein said melt-fabricable fluoropolymer resin is copolymer comprising tetrafluoroethylene and at least one perfluoro(alkyl vinyl ether), said alkyl having 1–5 carbon atoms.

7. The process of claim 1, wherein said particles are particles produced by dispersion polymerization.

8. The process of claim 7, wherein said particles have a raw dispersion particle size of 50 to 350 nm.

9. The process of claim 7, wherein said particles have a raw dispersion particle size of 100 to 300 nm.

10. The process of claim 7, wherein said particles have a raw dispersion particle size of 150 to 250 nm.

11. The process of claim 1 wherein said beads have a D$_{50}$ of 100 to 3000 $\mu$m.

12. The process of claim 1 wherein said beads have a D$_{50}$ of 200 to 1000 $\mu$m.

13. The process of claim 1, wherein said beads are hardened by heat treatment below the melting point of said fluoropolymer.

14. The process of claim 1, wherein said beads are treated by exposure to elemental fluorine.

15. The process of claim 2, wherein R$_5$ contains an ether oxygen.

16. The process of claim 2, wherein said solvent is solvent (a).

17. The process of claim 2, wherein said solvent is solvent (b).

18. The process of claim 1, wherein the weight ratio of said solvent to fluoropolymer resin is 0.4–1.4.

* * * * *